United States Patent
Murray et al.

(10) Patent No.: US 9,497,021 B2
(45) Date of Patent: Nov. 15, 2016

(54) DEVICE FOR GENERATING A MESSAGE AUTHENTICATION CODE FOR AUTHENTICATING A MESSAGE

(75) Inventors: Bruce Murray, Hamburg (DE); Pieter Janssens, Berchem (BE)

(73) Assignee: NXP B.V., Eindhoven (NL)

(*) Notice: Subject to any disclaimer, the term of this patent is extended or adjusted under 35 U.S.C. 154(b) by 628 days.

(21) Appl. No.: 12/870,756

(22) Filed: Aug. 27, 2010

(65) Prior Publication Data

US 2011/0051927 A1   Mar. 3, 2011

(30) Foreign Application Priority Data

Aug. 27, 2009   (EP) ..................... 09168875

(51) Int. Cl.
| | |
|---|---|
| *H04L 29/06* | (2006.01) |
| *H04L 9/00* | (2006.01) |
| *H04L 9/06* | (2006.01) |

(52) U.S. Cl.
CPC .............. *H04L 9/003* (2013.01); *H04L 9/0643* (2013.01); *H04L 2209/805* (2013.01)

(58) Field of Classification Search
CPC ............. H04L 9/00; H04L 9/06; H04L 9/08; H04L 9/3223; H04L 9/003; H04L 9/0643; H04L 2209/805
USPC ............... 380/28, 29, 37, 280, 259, 42, 273; 713/160, 168, 170, 181
See application file for complete search history.

(56) References Cited

U.S. PATENT DOCUMENTS

| | | | |
|---|---|---|---|
| 5,483,598 A * | 1/1996 | Kaufman ............... | H04L 9/0662 380/43 |
| 5,673,319 A * | 9/1997 | Bellare ................. | H04L 9/0637 380/259 |
| 6,182,216 B1 * | 1/2001 | Luyster .................. | H04L 9/002 380/28 |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,333,983 B1 * | 12/2001 | Enichen et al. ............. | 380/273 |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,654,884 B2 | 11/2003 | Jaffe et al. | |
| 7,403,620 B2 | 7/2008 | Liardet et al. | |
| 7,668,310 B2 | 2/2010 | Kocher et al. | |

(Continued)

FOREIGN PATENT DOCUMENTS

CN   101202623 A   6/2008

OTHER PUBLICATIONS

JH. Song et al, The AES-CMAC Algorithm, RFC: 4493, pp. 1-20, 2006.*

(Continued)

*Primary Examiner* — David García Cervetti

(57) ABSTRACT

Device for generating a message authentication code for authenticating a message, wherein the message is divided in blocks (M) with a specified block length, the device comprising a generating unit for generating the message authentication code based on a message by using a block cipher algorithm, and an encrypting unit for performing an exclusive disjunction on the last block with a first key (K1, K2) and for performing an exclusive disjunction on the first and/or the last block additionally with a second key (K3, K4) for generating the message authentication code.

16 Claims, 3 Drawing Sheets

(56) References Cited

U.S. PATENT DOCUMENTS

| | | | |
|---|---|---|---|
| 7,991,158 B2 | 8/2011 | Narendra et al. | |
| 8,102,997 B2 | 1/2012 | Teglia et al. | |
| 8,341,417 B1* | 12/2012 | McGrew | 713/181 |
| 8,635,452 B2 | 1/2014 | Murray et al. | |
| 2001/0033656 A1* | 10/2001 | Gligor | H04L 9/0637 380/28 |
| 2001/0046292 A1* | 11/2001 | Gligor | H04L 9/0662 380/37 |
| 2002/0051537 A1* | 5/2002 | Rogaway | H04L 9/0643 380/46 |
| 2002/0071552 A1* | 6/2002 | Rogaway | H04L 9/0637 380/37 |
| 2003/0140240 A1 | 7/2003 | Jaffe et al. | |
| 2004/0139321 A1* | 7/2004 | Shaffer et al. | 713/170 |
| 2005/0175175 A1 | 8/2005 | Leech | |
| 2005/0210260 A1* | 9/2005 | Venkatesan | H04L 9/0643 713/180 |
| 2006/0230274 A1* | 10/2006 | Surendran | H04L 9/0625 713/176 |
| 2007/0245147 A1* | 10/2007 | Okeya | H04L 9/0643 713/181 |
| 2007/0286416 A1* | 12/2007 | Bertoni et al. | 380/37 |
| 2008/0044014 A1* | 2/2008 | Corndorf | 380/37 |
| 2008/0098231 A1* | 4/2008 | Martinez et al. | 713/176 |
| 2008/0104400 A1 | 5/2008 | Kocher et al. | |
| 2008/0112561 A1* | 5/2008 | Kim | H04L 9/0643 380/42 |
| 2008/0137853 A1* | 6/2008 | Mizikovsky et al. | 380/247 |
| 2009/0119510 A1* | 5/2009 | Long et al. | 713/171 |
| 2009/0138708 A1* | 5/2009 | Miyazaki | H04L 63/12 713/168 |
| 2009/0147947 A1* | 6/2009 | Ingimundarson et al. | 380/29 |
| 2009/0171878 A1* | 7/2009 | Zeng | G06F 21/645 706/46 |
| 2010/0058070 A1* | 3/2010 | Garay | H04L 9/0631 713/190 |
| 2010/0268960 A1* | 10/2010 | Moffat et al. | 713/181 |
| 2011/0002459 A1* | 1/2011 | Kim | H04L 9/3242 380/28 |
| 2011/0138182 A1* | 6/2011 | Murray | H04L 9/0631 713/168 |
| 2012/0017089 A1 | 1/2012 | Kocher | |

OTHER PUBLICATIONS

Mihir Bellare et al, Improved Security Analysis for CBC MACs, Crypto 2005, pp. 527-545, International Association for Cryptologic Research 2005.*

John Black et al, CBC MACs for Arbitrary-Length Messages: The Three-Key Constructions, Journal of Cryptology, 2005.*

B. Preneel : 'MAC Algorithms State of the Art and Recent Developments,' http://homes.esat.keleuven.be/~preneel, May 2008.

"FIPS 197, Advanced Encryption Standard", National Institute of Standards and Technology, 51 pgs., retrieved from the internet at: csrc.nist.gov/publications/fips/fips197/fips-197.pdf, (Nov. 26, 2001).

Dworkin, M. "Recommendation for Block Cipher Modes of Operation: The CMAC Mode for Authentication", National Institute of Standards and Technology, 25 pgs, retrieved from the internet at: csrc.nist.gov/publications/nistpubs/800-38B/SP_800-38B.pdf (May 2005).

Okeya, K. et al. "Side Channel Attacks on Message Authentication Codes", Information Processing Society of Japan, vol. 2, pp. 478-488 (Aug. 1, 2006).

Okeya, K. "Side Channel Attacks Against Hash-Based MACs with PGV Compression Functions", IEICE Transactions Fundamentals of Electronics, Communications and Computer Sciences Society, vol. E91-A, No. 1, pp. 168-175 (Jan. 2008).

Extended European Search Report for Patent Appl. No. 09168875.4 (Sep. 23, 2010).

"Istewart at acm.org, Re: [Cfrg] MACs: to Truncate or not to Truncate?", http://www.ietf.org/mail--archive/web/cfrg/current/msg00433.html, Sep. 13, 2013, 2 pg.

Bersani, "[Cfrg] MACs to Truncate or not toTruncate?", 2004, 4 pg.

Daemen, et al., "A New Construction and ALRED and a Specific Instance ALPHA-MAC", STMicroelectronics, 2005, 18 pg.

Daemen, et al., "The Block Cipher BKSQ, Lecture Notes in Computer Sciences", vol. 1820, 2000, 236-245.

Dworkin, "Recommendation for Block Ciper Modes of Operation", The CMAC Mode for Authentication, NIST Special Publication 800-38B, National Institute of Standards and Technology, May 2005, 26 pg.

Menezes, et al., "Handbook of Applied Cryptography (Discrete Mathematics and Its Applications)", Chapter 9 Hash Functions and Data Integrity; CRC Press, Oct. 1996, 61.

Menezes, et al., "Handbook of Applied Cryptography (Discrete Mathematics and Its Applications)", Chapter 7 Block Ciphers, CRC Press, Oct. 1996, 62.

Nakashima, et al., "Power Analysis Attack on AES and Countermeasure, The Institute of Electronics", Information and Communication Engineers, 2003, 6 pg.

Samiah, et al., "An efficient Software Implementation of AES-CCM for IEEE", IEEE Proceedings of 31st Annual International Computer Software and Applications Conference, vol. 2, 2007, 694-694.

* cited by examiner

DEVICE FOR GENERATING A MESSAGE AUTHENTICATION CODE FOR AUTHENTICATING A MESSAGE

This application claims the priority of European patent application no. 09168875.4, filed on Aug. 27, 2009, the contents of which are incorporated by reference herein.

FIELD OF THE INVENTION

The invention relates to a device for generating a message authentication code for authenticating a message. Furthermore, the invention relates to a system for generating a message authentication code for authenticating a message. Moreover, the invention relates to a smart card. Furthermore, the invention relates to a method for a generating a message authentication code for authenticating a message. Beyond this, the invention relates to a program element. Furthermore, the invention relates to a computer-readable medium.

BACKGROUND OF THE INVENTION

During message transmission, messages may be changed by an attacker. To avoid such an attack, there exist different approaches. One of these approaches is a method for constructing message authentication codes (MACs) using block ciphers and is known as "CMAC".

The MAC on a message is constructed by splitting it into blocks of size equal to the blocksize of the underlying cipher (e.g. 128 bits in the case of AES), CBC-encrypting the message (with padding in the last block if required), and retaining (all or part of) the result of the last block encryption as the computed MAC value. In the event that a MAC shorter than the cipher blocksize is to be used, the computed MAC may be truncated by retaining the required number of most significant bits. A MAC algorithm, sometimes called a keyed (cryptographic) hash function, accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content.

Differential power analysis is a form of side channel attack in which the attacker studies the power consumption of a cryptographic hardware device (such as a smart card, tamper-resistant "black box", or integrated circuit). The attack can non-invasively extract cryptographic keys and other secret information from the device. To prevent certain cryptographic attacks, some MAC construction algorithms may re-encrypt the last block of the message with a further key. Nevertheless, such an encrypted message authentication code remains vulnerable to DPA attacks since the first-block-input and last-block-output vectors are still visible.

SUMMARY OF THE INVENTION

Hence, it is an object of the invention to provide a device providing a more secure authentication of a message.

The object of the invention is achieved by a device, a system, a smart card, a method, a program element and a computer-readable medium according to the independent claims.

According to an exemplary embodiment, a device for generating a message authentication code for authenticating a message is provided, wherein the message is divided in blocks with a specified block length, wherein the device comprises a generating unit for generating the message authentication code based on a message by using a block cipher algorithm, and an encrypting unit for performing an exclusive disjunction on the last block with a first key and for performing an exclusive disjunction on the first and/or the last block additionally with a second key for generating the message authentication code.

According to another exemplary embodiment, a system for generating a message authentication code for authenticating a message is provided, wherein the message is divided in blocks with a specified block length, wherein the system comprises a sender and a receiver, wherein the sender and the receiver comprise a device with the above mentioned features, respectively.

According to still another exemplary embodiment, a smart card is provided, wherein the smart card comprises a device with the above mentioned features.

According to still another exemplary embodiment, a method for generating a message authentication code for authenticating a message is provided, wherein the message is divided in blocks with a specified block length, the method comprising generating the message authentication code based on a message by using a block cipher algorithm, performing an exclusive disjunction on the last block with a first key, and performing an exclusive disjunction on the first and/or the last block additionally with a second key for generating the message authentication code.

According to still another exemplary embodiment of the invention, a program element (for instance a software routine, in source code or in executable code, for instance a downloadable program) is provided, which, when being executed by a processor, is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "block cipher algorithm" may denote an algorithm using a block cipher. A block cipher is a symmetric key cipher operating on fixed-length groups of bits, termed blocks, with an unvarying transformation. A block cipher encryption algorithm might take (for example) a 128-bit block of plaintext as input, and output a corresponding 128-bit block of ciphertext.

The generating unit and the encrypting unit may be formed as a single unit and/or on a single chip.

The term "exclusive disjunction" may denote also an exclusive-ORing or XOR-function on the different blocks. The encrypting unit may perform with one or more additional keys an XORing of these keys with the relevant data vector, and the linearity of this XOR step may provide a protection against DPA.

The first key may also be a pair of keys, wherein only one of the pair of keys may be used respectively.

The message authentication code may be used for authenticating a message sent from a sender to a receiver. The sender may generate the message authentication code based on the message and the first and the second key and send this code together with the message to the receiver. The receiver may receive the message together with the code and generate a code based on the message and the first and the second key itself. Subsequently, the receiver may compare the received message authentication code with the self-generated message authentication code and authenticate in this way the received message.

The term "sender" may denote a transponder or any similar device and the term "receiver" may denote for example a communication partner for the responder.

The term "smart card" may denote also a chip card or integrated circuit card.

In the following, further exemplary embodiments of the device will be explained. However, these embodiments also apply to the system, to the smart card, to the method, to the program element and to the computer-readable medium.

According to an exemplary embodiment, the block cipher algorithm may be a message authentication code algorithm. In cryptography, a message authentication code (often MAC) is a short piece of information used to authenticate a message. A MAC algorithm, sometimes called a keyed (cryptographic) hash function, accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content.

MACs differ from digital signatures, as MAC values are both generated and verified using the same secret key. This implies that the sender and receiver of a message must agree on keys before initiating communications, as is the case with symmetric encryption.

According to a further exemplary embodiment, the encrypting unit may be adapted for using a first second key for the first block and a second second key for the last block. The first and second second keys may also be called first additional key and second additional key. Thus, it may be more difficult for an attacker to gain any information for both keys.

According to a further exemplary embodiment, the second key may depend on the first key. Either or both of the second keys, that means the first and the second second key may depend on the first key. Thus, the second key may be any computable function of the first key. In general, a function is an abstract entity that associates an input, here the first key, to a corresponding output, here the second key, according to some rule.

According to a further exemplary embodiment, the second key may exchangeable between the device and a communication partner. The device may be a transponder and the communication partner may be a corresponding receiver. In this case, the second key may be known to the device and to the communication partner prior to the generation of the message authentication code.

Embodiments of the invention are related to transponders, in particular smart cards and RFID tags. For the sake of clarity, this description makes reference primarily to smart cards, although for one skilled in the art it is clear that embodiments of the invention equally relate to RFID tags and transponders in general, as well as to devices in general which communicate over a wired or wireless connection.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
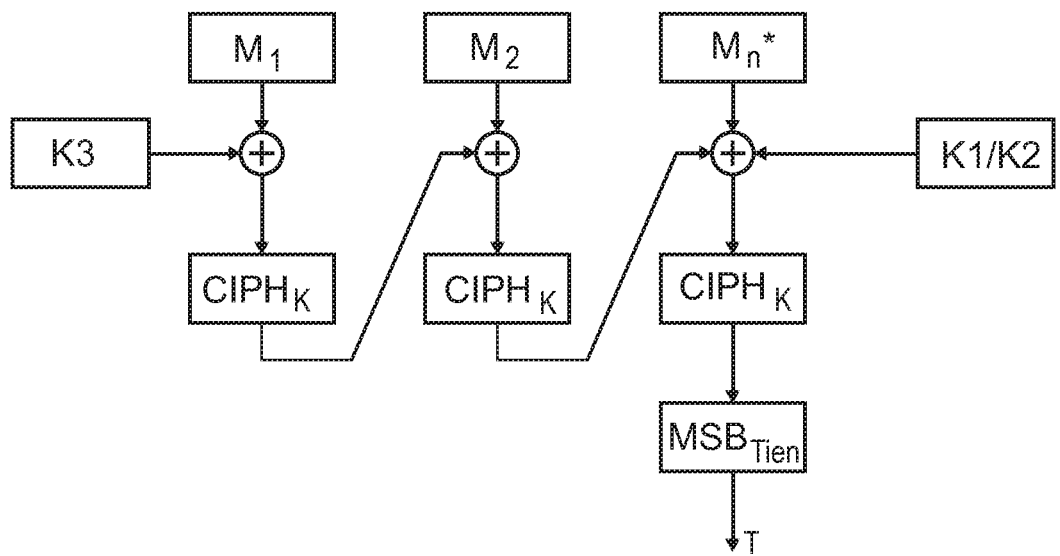
FIG. 1 shows a principle of a method according to an exemplary embodiment of the invention.

The illustration in the drawing is schematically. In different drawings, similar or identical elements are provided with the same reference signs.

The NIST (National Institute of Standards and Technology) recommend a method for construction of message authentication codes (MACs) using a block cipher known as cipher-based MAC (CMAC).

The MAC on a message is constructed by splitting it into blocks of size equal to the blocksize of the underlying cipher (e.g. 128 bits in the case of Advanced Encryption Standard (AES)), CBC (cipher block chaining)-encrypting the message (with padding in the last block if required), and retaining (all or part of) the result of the last block encryption as the computed MAC value. In the event that a MAC shorter than the cipher blocksize is to be used, the standard dictates that the computed MAC should be truncated by retaining the required number of most significant bits.

Figure 4:
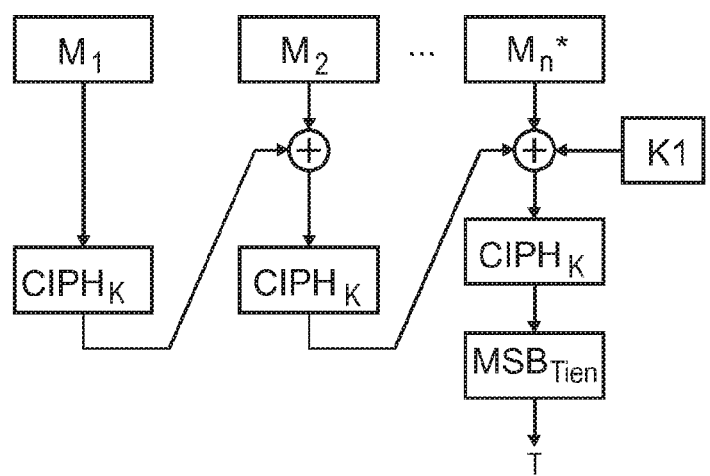
FIG. 4 shows a principle of a common method for generating a method authentication code.

FIG. 4 shows the principles of MAC construction according to this standard. Special attention should be paid to the operations of "subkey insertion" on the last block. The subkeys K1 or K2 are secret constants, derived from the encryption of a constant vector under the MAC key in use, which are additionally XORed with the input to the final block operation. The objective of making the last block operation different from all others is to prevent simple "MAC-chaining" attacks which become possible in the absence of "special last blocks". In general, without this "special last block" function, using this principle, an attacker can concatenate in an arbitrary fashion suitably modified MAC'd messages he has previously seen computed under the same MAC key, for example within a communication session. With this measure, since derivation of the subkey requires knowledge of the MAC key, an attacker is no longer able to chain messages when only the last block operation includes this constant which is unknown to him.

Differential Power Analysis (DPA) attacks operate by testing a hypothesis about (part of) a cryptographic key; such a hypothesis is tested by correlating power trace measurements of a device when using the key being attacked against its expected internal signals under the assumption that the hypothesis is correct. With the correct hypothesis, large increases in computed correlation can be observed compared to the cases where the hypothesis is incorrect. Typically, such attacks require a large number of power traces (of the order of $10^6$, although the exact number is implementation-dependent).

In order to perform DPA attacks, the attacker needs to be able to convert his hypothesis about part of the key into some expectation about the internal signal he is correlating against the power trace. Usually, in the case of a block cipher operating in encrypt-mode, this means that he needs to know either the input data vector, whereupon he can perform an encryption operation which depends on the part of the key about which he has a hypothesis; this is typically the action of a first-round substitution (or S-box) on a combination of key and input data, or the output data, whereby he can perform the equivalent of a decryption operation by working backwards through the last round to derive an expected internal signal.

Note that it is not necessary for the attacker to have access to both input and output for such an attack, which makes the application of DPA very general and powerful. A complete DPA attack to recover a key is usually a multi-stage process; the attacker gathers a large number of power traces with known input or output data as described above. These same traces are used a number of times to test hypotheses about different parts of the cipher key in use, enabling the attacker to derive all or most of the key bits. In practice, he usually recovers the "round key" for the first or last round, from which he can derive the logical key from a knowledge of the scheduling/expansion algorithm.

In the specific case of AES, an attacker would typically test hypotheses one byte at a time, corresponding to the action of data and a round key byte on one of the S-box instances. Once he has recovered 16 round key bytes, the logical key in use is easily derived, since the AES key expansion can be computed either forwards or backwards.

In general, the same principles can apply whether DPA is used to perform a key recovery attack on encryption, decryption, or MAC computation/verification. In the case of an encryption operation, it is usually the output ciphertext that is available to an attacker, whilst a MAC computation is often performed on known message data, that means the input is available.

Thus, for MAC on known message data, the input to the first block operation is wholly known; the inputs to subsequent blocks are not known due to the block chaining The output of only the last block is known (unless the MAC is truncated, in which case the last block output is only partly known), since it is the MAC result itself. In the case of a single-block MAC, the block operation can be thought of as a "final block"; a subkey is used, so the input to the block operation is not known, in this case because of the effect of the XORing of a CMAC subkey value not known to an attacker.

According to a first exemplary embodiment, a principle of generating a MAC is shown in FIG. 1, which prevents DPA-attacks on the visible first-block-input vector. The presence of a subkey, which may be a value similar to K1/K2 as specified by CMAC, but next to this also a completely independent shared secret of block length size can possibly be used, obscures the data vector required by an attacker to mount a DPA attack. In the method shown in FIG. 1, a subkey value K3 is added by XORing it with the input to the first block operation.

An alternative mechanism which can be used to protect the visible first-block-input against DPA attacks is to limit the possible values of the M1 message block to a small number of possibilities. When the visible first block vector can only take a small number of values, this number acts as an upper bound on the number of different traces the attacker is able to collect in order to mount his DPA attack. If this number is already below the threshold of DPA attack resistance which a given implementation provides, then such an attack cannot be successfully mounted.

Figure 2:
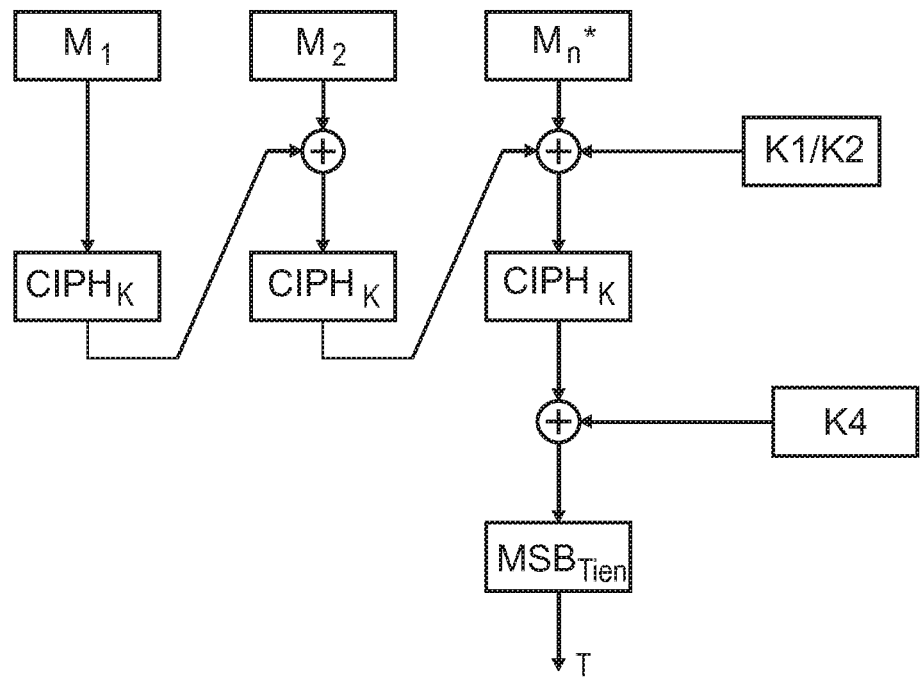
FIG. 2 shows a principle of the method according to a further exemplary embodiment of the invention.

The same approach as used in FIG. 1 may be used to protect the visible output from the last block operation as shown in FIG. 2. In this case, it is important to protect the entire output vector, so the insertion of the subkey is performed directly on the output of the final block operation, before the truncation operator (which of course may be "null"). In FIG. 2, the additional subkey K4 insertion is shown. As a result of the subkey insertion, the output vector from the last subkey operation is not visible to an attacker.

Figure 3:
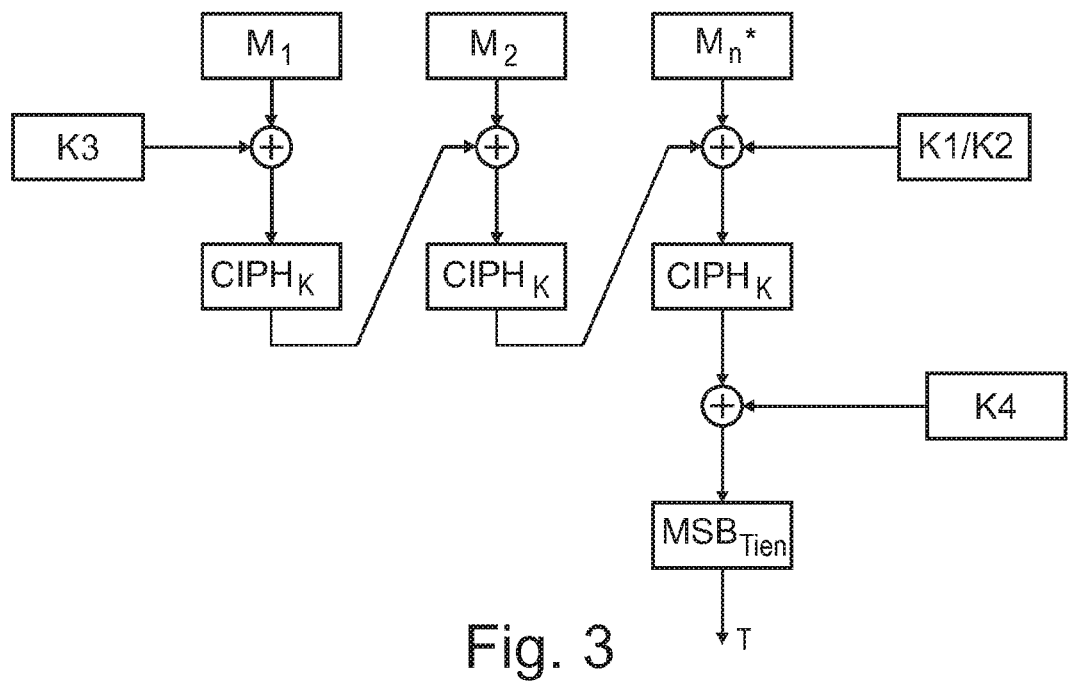
FIG. 3 shows a principle of the method according to a further exemplary embodiment of the invention.

Also a combination of the principles shown in FIGS. 1 and 2 may be provided as shown in FIG. 3. Here, the first subkey K3 is inserted into the method for the first block and also the second subkey K4 is inserted into the method for the last block.

In the case of a MAC on a single-block message, the presence of one of the standard subkeys K1/K2 is sufficient to protect the input vector; in this case, one would not need to use the subkey K3.

The presence of the subkey K3 or K4 acts as a mask which prevents the attacker from deriving correct logical key information from his DPA attack. To understand this more clearly, consider FIGS. 5a and 5b.

Figure 5A:
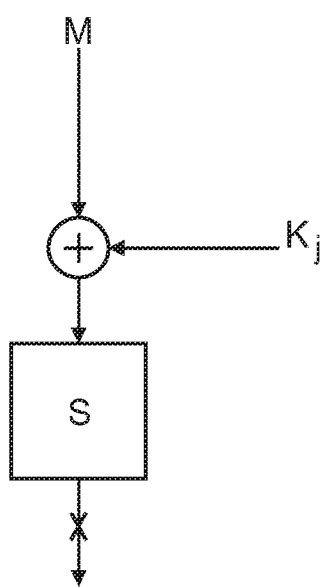
FIGS. 5a and 5b shows an attack without and with using a method or device according to an exemplary embodiment of the invention.

In FIG. 5a, the part of the input vector which affects the input to an S-box (substitution box) in the first round is denoted by M, and Kj is the portion of the first round key which affects that S-box; for multiple inputs M, the attacker makes a hypothesis about the value of Kj and tests for confirmation of that hypothesis using the above decribed process. The DPA attack is typically mounted at the output of the S-box, shown with a X. The subscript "j" here denotes only that Kj is a portion of the roundkey (called the "j-portion" hereafter); when AES is the block cipher used, it really is a specific byte of the (first round) key; however, for other block ciphers e.g. as in the case of DES, the portion of key involved may not consist of contiguous bits.

Note that the bitsize of Kj must be sufficiently small that the attacker can test all possible hypotheses about its possible value in a reasonable time; for example, with the AES cipher, each first round S-box is affected by 8 bits of round key so there are 256 hypotheses to test.

Figure 5B:
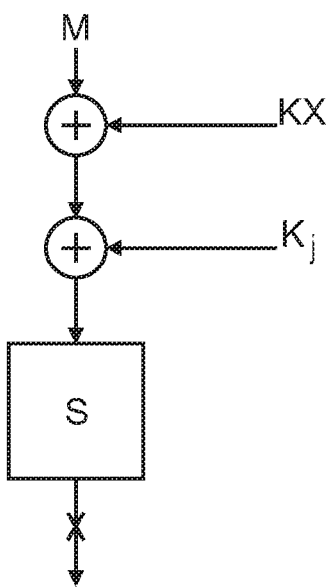

In FIG. 5b, the configuration in the presence of a subkey is shown. The subkey KX may be a function of K (f(K)) or a specified secret value. What the attacker can recover by a DPA attack is the value which is the exclusive-OR of KX and Kj; however, this does not unambiguously reveal the subkey. In the case, that the subkey is a function of K, the "j-portion" of the key K is not unambigously revealed, since the j-portion of f(K) i.e. [f(K)]j depends on the whole key (at least when the function f( ) is the conventional one used to create subkeys i.e. encryption of a constant vector under the key K). The attacker cannot make and test an independent hypothesis about only the j-portion of K since his test is affected by all other portions at the same time (at least in the case where f( ) has the properties of a well-behaved block-cipher).

In general, the "subkey" can of course be any secret value known only to the creator and verifier of the MAC, which is not necessarily derived from the MAC key; in this case, it acts as an XOR mask acting on the initial round key portion.

The MAC constructions described herein are designed to protect input and output vectors for the purposes of resisting key recovery attacks using DPA.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A device configured to generate a message authentication code for authenticating a message, wherein the message is divided into a plurality of blocks with a specified block length, the device comprising:
    a first round configured to perform an exclusive disjunction on a first block of the plurality of blocks with a first key and send a first result into a cipher block to produce a first round output;
    a last round configured to perform an exclusive disjunction on a last block of the plurality of blocks with a second key and an output from a prior round, and send a second result into the cipher block to produce a last round output; and
    a security device configured to perform an exclusive disjunction on the last round output with a third key to produce the message authentication code.

2. The device according to claim 1, wherein the first key depends on the second key.

3. The device according to claim 1, wherein the first key is exchangeable between the device and a communication partner.

4. A system for authenticating the message, the system comprising a sender and a receiver, wherein the sender and the receiver comprise the device according to claim 1, respectively.

5. A smart card comprising the device according to claim 1.

6. The device of claim 1, further comprising:
    at least one intermediate round configured to perform an exclusive disjunction on an at least one intermediate block with a respective key and send an intermediate result into the cipher block to produce an intermediate round output.

7. The device of claim 1, wherein the first round is configured to prevent Differential Power Analysis (DPA) attacks on a visible first block input vector.

8. The device of claim 1, wherein the last round is configured to prevent an attacker from viewing an output vector.

9. A method for generating a message authentication code for authenticating a message, wherein the message is divided into a plurality of blocks with a specified block length, the method comprising:
    performing, by a first round, an exclusive disjunction on a first block of the plurality of blocks with a first key and sending a first result into a cipher block to produce a first round output;
    performing, by a last round, an exclusive disjunction on a last block of the plurality of blocks with a second key and an output from a prior round;
    sending a second result into the cipher block to produce a last round output; and
    performing, by a security device, an exclusive disjunction on the last round output with a third key to produce the message authentication code.

10. The method of claim 9, further comprising:
    performing, with at least one intermediate round, an exclusive disjunction on an at least one intermediate block with a respective key and sending an intermediate result into the cipher block to produce an intermediate round output.

11. The method of claim 9, wherein the first round is configured to prevent Differential Power Analysis (DPA) attacks on a visible first block input vector.

12. The method of claim 9, wherein the last round is configured to prevent an attacker from viewing an output vector.

13. A non-transitory computer-readable medium with an executable program stored thereon, wherein the non-transitory computer-readable medium comprises:
    instructions for performing, by a first round, an exclusive disjunction on a first block of the plurality of blocks with a first key and sending a first result into a cipher block to produce a first round output;
    instructions for performing, by a last round, an exclusive disjunction on a last block of the plurality of blocks with a second key and send a second result into the cipher block to produce a last round output; and
    instructions for performing, by a security device, an exclusive disjunction on the last round output with a third key to produce the message authentication code.

14. The non-transitory computer-readable medium of claim 13, further comprising:
    instructions for performing, with at least one intermediate round, an exclusive disjunction on an at least one intermediate block with a respective key and sending an intermediate result into the cipher block to produce an intermediate round output.

15. The non-transitory computer-readable medium of claim 13, wherein the first round is configured to prevent Differential Power Analysis (DPA) attacks on a visible first block input vector.

16. The non-transitory computer-readable medium of claim 13, wherein the last round is configured to prevent an attacker from viewing an output vector.

* * * * *